US009621880B2

(12) United States Patent
Takahashi et al.

(10) Patent No.: US 9,621,880 B2
(45) Date of Patent: Apr. 11, 2017

(54) IMAGE PROCESSOR FOR DISPLAYING IMAGES IN A 2D MODE AND A 3D MODE

(75) Inventors: Masaki Takahashi, Kanagawa (JP); Yoshinobu Matono, Saitama (JP); Shuji Hiramatsu, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 387 days.

(21) Appl. No.: 14/127,265

(22) PCT Filed: May 28, 2012

(86) PCT No.: PCT/JP2012/003467
§ 371 (c)(1),
(2), (4) Date: Dec. 18, 2013

(87) PCT Pub. No.: WO2013/021529
PCT Pub. Date: Feb. 14, 2013

(65) Prior Publication Data
US 2014/0354786 A1    Dec. 4, 2014

(30) Foreign Application Priority Data
Aug. 5, 2011  (JP) .................. 2011-172289

(51) Int. Cl.
*G11B 27/038*  (2006.01)
*H04N 13/04*  (2006.01)
(Continued)

(52) U.S. Cl.
CPC ..... *H04N 13/0497* (2013.01); *H04N 13/0025* (2013.01); *H04N 13/0033* (2013.01);
(Continued)

(58) Field of Classification Search
CPC .......... G06F 17/30056; G09G 2340/10; G09G 3/003; G11B 27/038; H04N 13/0007;
(Continued)

(56) References Cited

U.S. PATENT DOCUMENTS 5,812,216 A * 9/1998 Peters .................. G11B 27/034
348/590
2003/0090485 A1* 5/2003 Snuffer ................. G06T 15/405
345/422
(Continued)

FOREIGN PATENT DOCUMENTS

CN      1795682      6/2006
CN    102067616      5/2011
(Continued)

OTHER PUBLICATIONS

International Search Report dated Aug. 21, 2012 from the corresponding PCT/JP2012/003467.
(Continued)

*Primary Examiner* — Jamie Atala
*Assistant Examiner* — James Boylan
(74) *Attorney, Agent, or Firm* — Katten Muchin Rosenman LLP

(57) ABSTRACT

A mode setting part 112 has a function to selectively set 2D and 3D display output modes. A play control part 132 changes the manner in which to control switching between display images in accordance with the display output mode set by the mode setting part 112. The play control part 132 changes the opacities of first and second display images with time so that when the two display images are cross-faded, the sum of the opacities of the first and second display images in a 3D display output mode is equal to or smaller
(Continued)

than the sum of the opacities of the first and second display images in a 2D display output mode during a cross-fading period.

3 Claims, 9 Drawing Sheets

(51) Int. Cl.
  *G09G 3/00* (2006.01)
  *H04N 13/00* (2006.01)
  *G06F 17/30* (2006.01)

(52) U.S. Cl.
  CPC ..... *H04N 13/0044* (2013.01); *H04N 13/0454* (2013.01); *G06F 17/30056* (2013.01); *G09G 3/003* (2013.01); *G09G 2340/10* (2013.01); *G11B 27/038* (2013.01); *H04N 13/0007* (2013.01)

(58) Field of Classification Search
  CPC ........... H04N 13/0025; H04N 13/0033; H04N 13/0044; H04N 13/0454; H04N 13/0497
  USPC .......................................................... 348/51
  See application file for complete search history.

(56) References Cited

U.S. PATENT DOCUMENTS

| | | | | |
|---|---|---|---|---|
| 2007/0236493 | A1* | 10/2007 | Horiuchi | H04N 13/0438 345/419 |
| 2009/0185029 | A1 | 7/2009 | Mitsuhashi et al. | |
| 2011/0102555 | A1* | 5/2011 | Yasui | H04N 13/0429 348/51 |
| 2011/0169823 | A1* | 7/2011 | Barenburg | G06T 15/205 345/419 |
| 2011/0175978 | A1* | 7/2011 | Ito | H04N 13/0497 348/43 |
| 2011/0261160 | A1 | 10/2011 | Tadokoro et al. | |

FOREIGN PATENT DOCUMENTS

| | | |
|---|---|---|
| EP | 1 628 490 | 2/2006 |
| EP | 1848133 | 10/2007 |
| EP | 2 053 855 | 4/2009 |
| JP | 2005-109568 | 4/2005 |
| JP | 2005-136541 A | 5/2005 |
| JP | 2005-229560 A | 8/2005 |
| JP | 2008-042645 A | 2/2008 |
| JP | 2010-199740 A | 9/2010 |
| JP | 2010-258723 A | 11/2010 |
| JP | 2011-097470 A | 5/2011 |
| JP | 2011-150144 A | 8/2011 |
| JP | 2011-254176 | 12/2011 |

OTHER PUBLICATIONS

"Standard of the Camera & Imaging Products Association, CIPA DC-007-Translation-2009, Multi-Picture Format," Camera & Imaging Products Association, Feb. 4, 2009, Internet<URL:http://www.cipa.jp/english/hyoujunka/kikaku/pdf/DC-007_E.pdf>.
Notification of Reasons for Refusal dated Feb. 4, 2014, from the corresponding Japanese Patent Application No. 2011-172289.
Chinese First Office Action dated Apr. 3, 2015 from corresponding Application No. 201280036732.5.
Translation of International Preliminary Report on Patentability dated Feb. 11, 2014 from corresponding Application No. PCT/JP2012/003467.
European Search Report dated Feb. 6, 2015 from corresponding Application No. 12821547.2.
Anonymous: "Studio 3D Stereoscopic 3-D Imaging", Feb. 21, 2007, XP055165808, Retrieved from the Internet: URL:http://www.studio3d.com/pages2/powerpoint.htm; retrieved on Jan. 29, 2015.
Fujifilm Electronic Imaging Group GMBH: "FINEPIX Real 3D V1 Owner's Manual", Aug. 1, 2009, XP055165819, Kleve, Germany, Retrieved from the Internet: URL:http://www.fujifilm.com/support/3d/manuals/pdf/ index/finepix_real3dv1_manual_01.pdf, retrieved on Jan. 29, 2015.
Chun-Wei Liu, et. al.; "Stereoscopic media editing based on 3D cinematography principles", ACM SIGGRAPH '11 posters on, SIGGRAPH '11; Aug. 7, 2011, XP055165823, New York, NY, DOI: 10.1145/2037715.2037759, ISBN: 978-1-45-030971-4.
Nick Hemenway: "Transitions—Steroscopy & The Art of 3D Film", May 7, 2011, XP055165810, Retrieved from the Internet: URL:http://stereoscopy.co/utilizing-3d/editing/transitions, retrieved on Jan. 29, 2015.
Barry Aldous: "Overview Proshow Stereo Workflow Methods", Sep. 1, 2010, XP055165812; Retrieved from the Internet: URL:http://www.stereoscopicsociety.org.uk/Folios/Resources/Prowshow Gold Stero Workflow Methods.pdf; retrieved on Jan. 29, 2015.

* cited by examiner

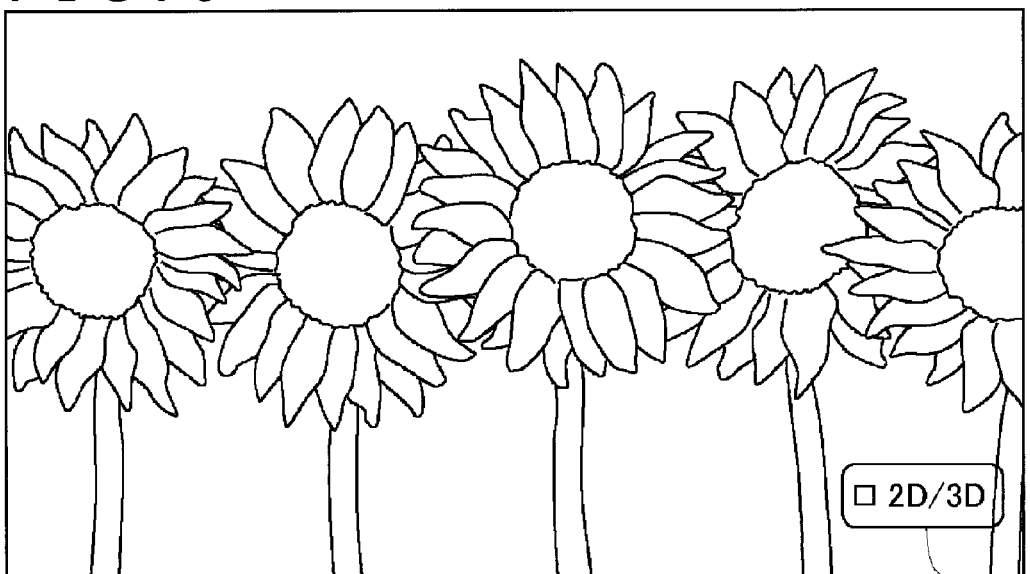

IMAGE PROCESSOR FOR DISPLAYING IMAGES IN A 2D MODE AND A 3D MODE

TECHNICAL FIELD

The present invention relates to an image processing technology.

BACKGROUND ART 3D displays typified by 3D (three-dimensional) television sets have found widespread use. A 3D display provides a stereoscopic image by showing images, one for the right eye and another for the left eye, to a user. Although there are a plurality of types of three-dimensional displays, the widespread ones have a user wear eyeglasses through which an image appears differently to the left and right eyes of the user. According to image processing technology in recent years, it has become possible to create left and right eye images by adding arithmetic operations to a 2D (two-dimensional) image.

With the improvement of the functions and performance of digital cameras, a format has been stipulated to record a plurality of pieces of correlated image data altogether. The standard laid down by the Camera & Imaging Products Association defines a data structure for recording a plurality of pieces of image data and stipulates a format called "Multi-Picture Format" using this data structure. In Multi-Picture Format, "multi-view" is defined as an image type. Multi-view has a "stereopsis" type as a subdivision. This image type is selected when the user specifies the capture mode at the time of image capture by a digital camera. Two pieces of image data captured are combined into a single image file including an image type code by internal circuitry of the digital camera.

CITATION LIST

Non Patent Literature

[NPL1]
"Standard of the Camera & Imaging Products Association, CIPA DC-007-Translation-2009, Multi-Picture Format," Camera & Imaging Products Association, Feb. 4, 2009, Internet<URL: http://www.cipa.jp/english/hyoujunka/kikaku/pdf/DC-007_E.pdf>

SUMMARY

Technical Problem

A 3D image produces stereoscopic effect by relying on the deviation (amount of parallax) between left and right images. The present inventor has gained knowledge that displaying a plurality of 3D images having different amounts of parallax consecutively may give a sense of discomfort to a user. Further, the present inventor has gained knowledge that moving a 3D image in the screen may similarly give a sense of discomfort to a user. For this reason, the present inventor has developed a technology for providing an image that can be viewed with comfort by a user on a 3D display. On the other hand, while users often wish to display 3D images captured with digital cameras in 3D, there are other users who wish to display images in 2D on a 3D display. This depends on the preferences of users, and it is preferable that suitable options can be presented to users.

It is an object of the present invention to provide a technology for properly playing image data.

Solution to Problem

In order to solve the above problem, an image processor according to an embodiment of the present invention includes a mode setting part and play control part. The mode setting part selectively sets a 2D display output mode and 3D display output mode. The play control part controls switching from one display image to another. The play control part changes the manner in which to control switching between display images in accordance with the display output mode set by the mode setting part.

It should be noted that any combinations of the above components and any conversions of expressions of the present invention between "method," "device," "system," "recording medium," "computer program" and so on are also effective as the embodiments of the present invention.

Advantageous Effect of Invention

The information processing technology according to the present invention provides a technology for properly playing image data.

BRIEF DESCRIPTION OF DRAWINGS

FIG. 6 is a diagram illustrating a notification image superimposed and displayed on a display screen.

FIG. 7 is a diagram illustrating a confirmation screen.

DESCRIPTION OF EMBODIMENT

Figure 1:
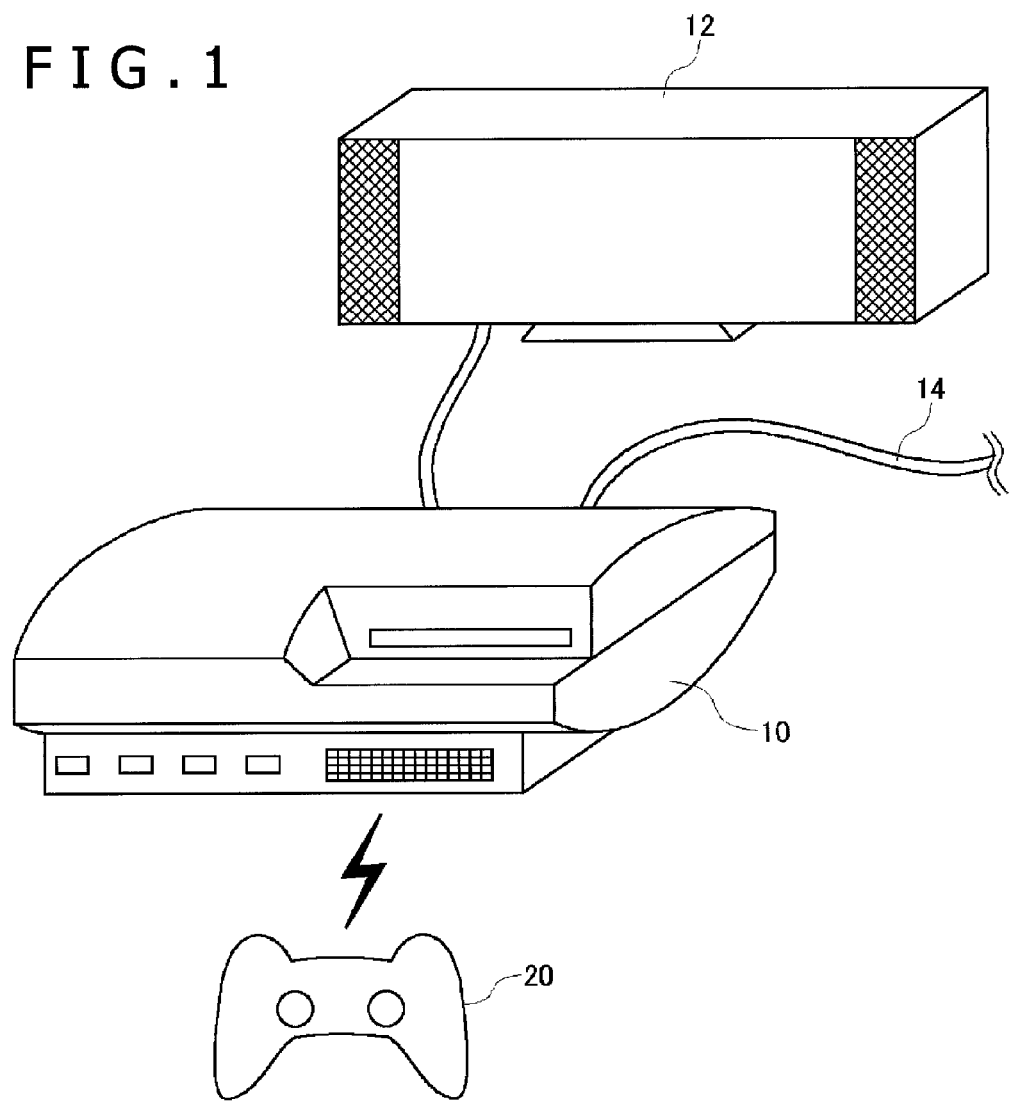
FIG. 1 is a diagram illustrating an environment in which an image processing system according to an embodiment of the present invention is used.

FIG. 1 is a diagram illustrating an environment in which an image processing system 1 according to an embodiment of the present invention is used. The image processing system 1 includes an input device 20, image processor 10 and display device 12. The input device 20 is operated by a user. The image processor 10 executes image processing software. The display device 12 outputs the result of processing performed by the image processor 10. The display device 12 is a 3D display which may be a television set having a display adapted to output an image and a speaker adapted to output audio or a computer display. The display device 12 may be connected to the image processor 10 by a cable or wireless LAN (Local Area Network). It should be noted that the image processor 10, input device 20 and display device 12 may be formed integrally as a mobile terminal having image processing function.

In the image processing system 1, the image processor 10 is connected to external equipment such as personal computer via a cable 14, thus making it capable of acquiring image data from the external equipment. Further, the image processor 10 has a USB (Universal Serial Bus) terminal for connection to a digital camera with a USB cable, thus making it possible to acquire image data from the digital camera. Still further, the image processor 10 has a media drive which permits it to acquire image data from a ROM medium or do so, for example, from an external server via a network.

The image processor 10 is, for example, a gaming machine adapted to implement an image processing function by loading an image processing application program. It should be noted that the image processor 10 may be a personal computer and implement an image processing function by loading an image processing application program.

The image processor 10 according to the present embodiment has a function to display a 3D image on the display device 12 by using image data captured in Multi-Picture Format as a stereoscopic image. Further, the image processor 10 may have a function to display a 3D image by converting 2D image data into 3D image data.

Still further, the image processor 10 has a function to perform three-dimensional computer graphics (3DCG). The image processor 10 has a geometry engine and rendering engine. The geometry engine sets up a light source and virtual cameras first, followed by perspective transformation. The rendering engine renders an object in a frame buffer based on perspectively transformed data. As the geometry engine sets up two virtual cameras in such a manner that the directions of the lines of sight of the cameras intersect each other, and the rendering engine renders data from the two virtual cameras, the display device 12 can display a 3D image.

Figure 2:
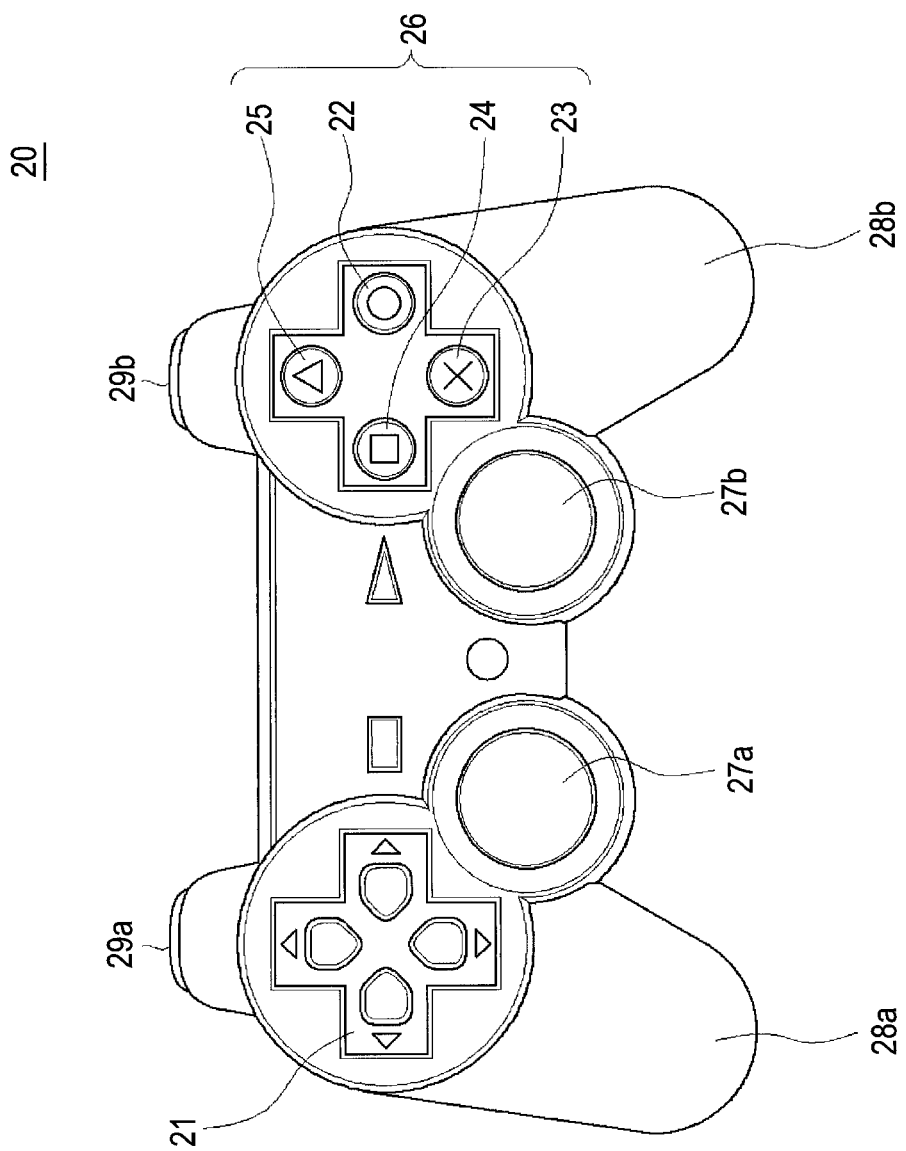
FIG. 2 is a diagram illustrating an appearance configuration of an input device.

FIG. 2 illustrates an appearance configuration of the input device 20. The input device 20 includes, on the front face of the enclosure, direction keys 21, analog sticks 27a and 27b, and four operating buttons 26. The four operating buttons 26 include a ○ button 22, X button 23, □ button 24 and Δ button 25. Further, an L1 button 29a and R1 button 29b are provided respectively on the left and right portions of the rear face of the enclosure of the input device 20. A user operates each operating means while holding a left grip 28a with the left hand and a right grip 28b with the right hand.

The input device 20 has a function to transmit an operating signal input by the user to the image processor 10 and is capable of communicating with the image processor 10 in a wireless manner in the present embodiment. Wireless connection between the input device 20 and image processor 10 may be established by using the Bluetooth (registered trademark) protocol or IEEE802.11 protocol. It should be noted that the input device 20 may be connected to the image processor 10 via a cable for transmission of an operating signal input from the user to the image processor 10.

Figure 3:
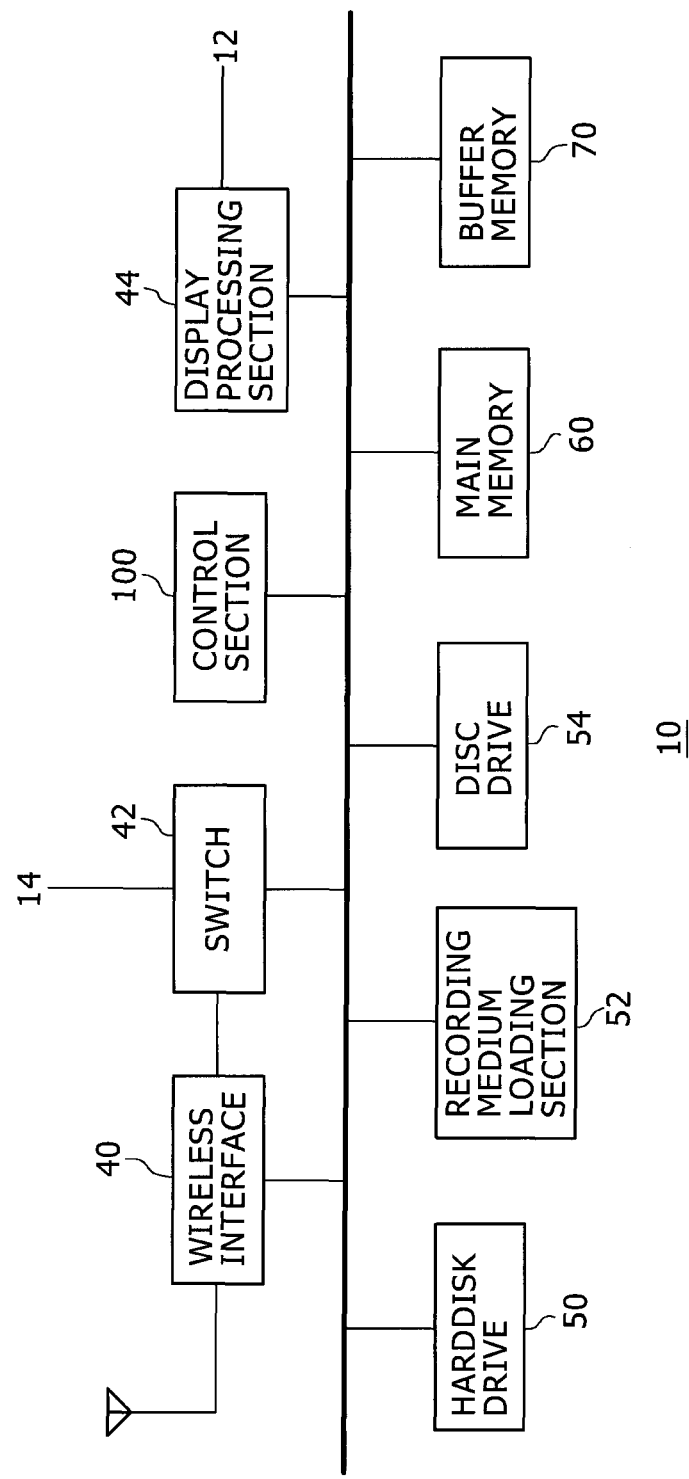
FIG. 3 is a functional block diagram of an image processor.

FIG. 3 is a functional block diagram of the image processor 10. The image processor 10 includes a wireless interface 40, switch 42, display processing section 44, harddisk drive 50, recording medium loading section 52, disc drive 54, main memory 60, buffer memory 70 and control section 100. The display processing section 44 has a frame memory adapted to buffer data to be displayed on the display of the display device 12.

The switch 42 is an Ethernet switch (Ethernet is a registered trademark), a device adapted to enable connection with an external device in a wired or wireless manner to exchange data. The switch 42 is connected to the wireless interface 40 which, in turn, is connected to the input device 20 through a given wireless communication protocol. An operating signal input by the user to the input device 20 is supplied to the control section 100 by way of the wireless interface 40 and switch 42.

Further, the switch 42 is connected to an external device via the cable 14, acquiring a plurality of image files from the external device. Image files may be image files (hereinafter referred to as "MP files") specified by the Multi-Picture Format (hereinafter referred to as the MP format) or image files specified by a normal format such as JPEG or GIF.

The harddisk drive 50 functions as an auxiliary storage device adapted to store data. An image file received via the switch 42 is stored in the harddisk drive 50. During a display process, the image file stored in the harddisk drive 50 is decoded first and then stored in the buffer memory 70.

When a removable medium such as memory card is loaded into the recording medium loading section 52, the recording medium loading section 52 reads data from the removable medium. When a read-only ROM disc is loaded into the disc drive 54, the disc drive 54 drives and recognizes the ROM disc, reading the data. The ROM disc may be an optical disk or magneto-optical disc. An image file may be stored in a removable recording medium or ROM disc and installed from the recording medium loading section 52 or disc drive 54 to the harddisk drive 50. Alternatively, an image file may be decoded during a display process and stored in the buffer memory 70.

The control section 100 includes a multi-core CPU which has, in a single CPU, a general-purpose processor core and a plurality of simple processor cores. The general-purpose processor core is referred to as a PPU (Power Processing Unit), and the remaining processor cores are referred to as SPUs (Synergistic-Processing Units).

The control section 100 includes a memory controller connected to the main memory 60 and buffer memory 70. The PPU has a register and includes a main processor adapted to primarily handle arithmetic operations, efficiently assigning tasks, units of basic processing for an application to be executed, to the SPUs. It should be noted that the PPU may handle the tasks by itself. Each of the SPUs has a register and includes a subprocessor adapted to primarily handle arithmetic operations and a local memory serving as a local storage area. The local memory may be used as the buffer memory 70. The main memory 60 and buffer memory 70 are configured as RAMs (Random Access Memories). Each of the SPUs has a dedicated DMA (Direct Memory Access) controller as a control unit, allowing for high speed data transfer between the main memory 60 and buffer memory 70 and high speed data transfer between the frame memory of the display processing section 44 and the buffer memory 70. The control section 100 according to the present embodiment achieves high speed image processing function by permitting the plurality of SPUs to operate in parallel. The display processing section 44 is connected to the display device 12, outputting the result of image processing handled by the control section 100 to the display device 12.

Figure 4:
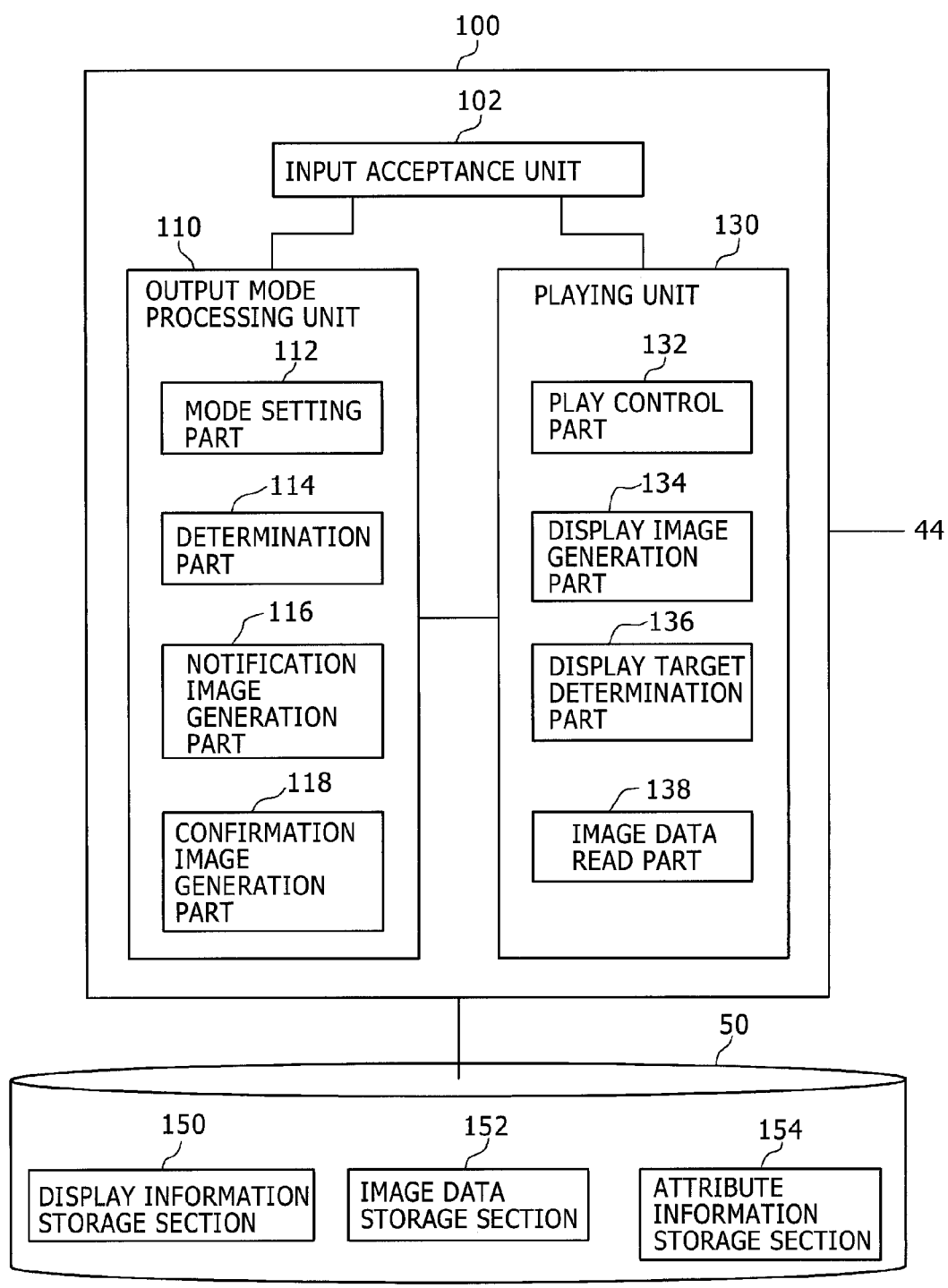
FIG. 4 is a diagram primarily illustrating functional blocks of a control section.

FIG. 4 primarily illustrates functional blocks of the control section 100. The control section 100 includes an input acceptance unit 102, output mode processing unit 110 and playing unit 130. The output mode processing unit 110 has a function to manage the display output mode set by the display processing section 44 and includes a mode setting part 112, determination part 114, notification image generation part 116 and confirmation image generation part 118. The playing unit 130 has a function to play image data and includes a play control part 132, display image generation part 134, display target determination part 136 and image data read part 138. At least some of these functions are implemented by the image play application (hereinafter referred to as the "image viewer") installed to the image processor 10.

In FIG. 4, each of the components described as the functional blocks adapted to perform various processes can be configured by a CPU (Central Processing Unit), memory and other LSIs in terms of hardware, and can be implemented by a program loaded into the memory in terms of software. As mentioned earlier, the control section 100 has a single PPU and a plurality of SPUs, allowing them to be used alone or in combination as one of the functional blocks. Therefore, it is understood by those skilled in the art that these functional blocks can be implemented in various ways by hardware alone, software alone or a combination thereof, and that the manner in which these functional blocks are implemented is not limited to any one of them.

A display information storage section 150 is configured as a storage area of the harddisk drive 50, storing display information of the display device 12 including the display size, resolution and output format. Display information is registered by the user when the image processor 10 is connected to the display device 12. It should be noted that if the image processor 10 and display device 12 are connected by an HDMI (High Definition Multimedia Interface) cable, the display device 12 may notify display information to the image processor 10 in response to an inquiry by the system software of the image processor 10 made to the display device 12. In the present embodiment, the output format of the display device 12 is information that indicates whether three-dimensional display or only two-dimensional display is possible. The output format that permits three-dimensional display will be hereinafter referred to as "3D compatible," and the output format that permits only two-dimensional display will be hereinafter referred to as "2D compatible."

An image data storage section 152 stores a plurality of pieces of image data. The image viewer according to the present embodiment can play not only photographic images stored in the harddisk drive 50 but also those recorded in an external recording medium. Therefore, the image data storage section 152 according to the present embodiment may be configured not only as a storage area of the harddisk drive 50 but also as a storage area of a storage medium in which image data to be played is recorded. FIG. 4 illustrates the image data storage section 152 configured as a storage area of the harddisk drive 50.

In the image processor 10, when an image file is installed to the harddisk drive 50, the system software refers to attached information included in the image file, thus checking the file. When the image file is in a proper condition, the system software extracts at least part of the attached information, storing it in an attribute information storage section 154 as attribute information. Attached information extracted in the present embodiment includes data displayed on the menu screen such as thumbnail image. If the image file is an MP file, the system software may identify the display format of the MP file from the MP file type code and store it in the attribute information storage section 154 as attribute information. It should be noted that when an image file is installed, the system software may generate a thumbnail image by downsizing the image data.

Figure 5:
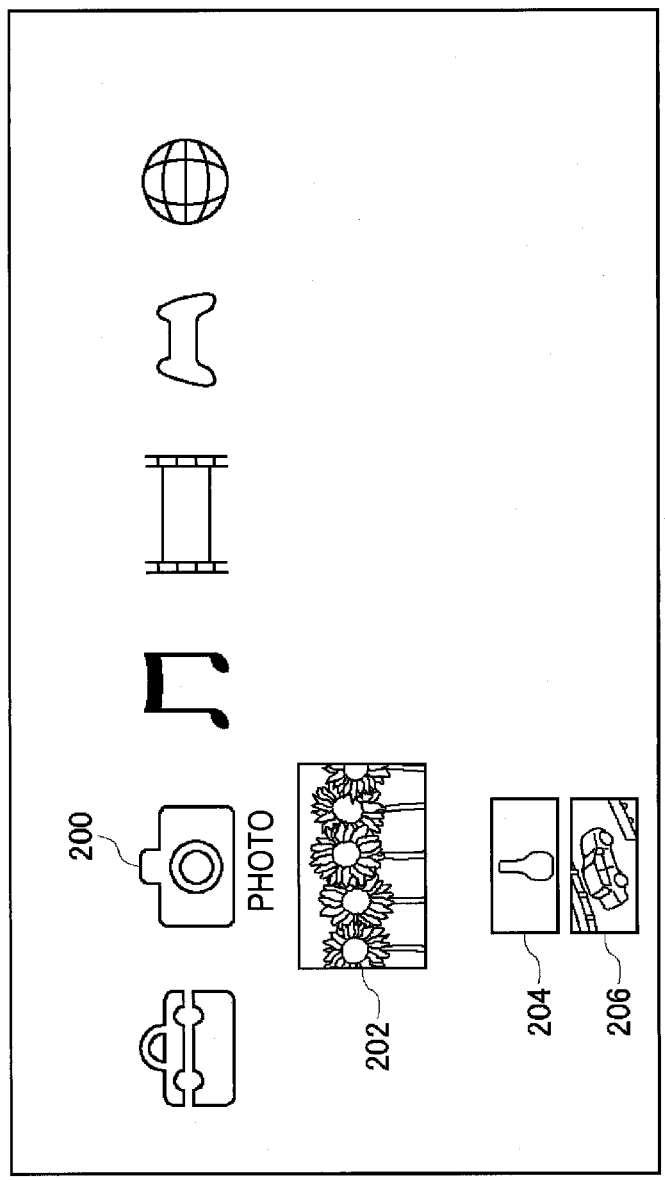
FIG. 5 is a diagram illustrating an example of a menu screen displayed on a display device.

FIG. 5 illustrates an example of a menu screen displayed on the display device 12. In the image processor 10 according to the present embodiment, the system software generates a menu image. Of a plurality of folder images arranged horizontally, a folder image 200 represents a photographic content folder. Icon images 202, 204 and 206 are arranged vertically. The user can perform the process associated with a desired icon image by operating the input device 20, scrolling the icon image to the focus area and pressing a given button on the input device 20. In the example shown in FIG. 5, the icon image 202 of photographic content is arranged in the focus area. When the user presses the ○ button 22 of the input device 20, a play instruction is generated, activating the image viewer. It should be noted that although no icon image of a recording medium storing image data is shown in the menu screen of FIG. 5, such an image may appear immediately under the photographic icon image, with the icon images 202, 204 and 206 arranged immediately under or on the right of the media icon image.

If an image file includes a thumbnail image, the system software generates an icon image using the thumbnail image, and if an image file does not include a thumbnail image, the system software generates an icon image by downsizing the image data. It should be noted that if the image file is an MP file, the system software reads attribute information from the harddisk drive 50, identifying the thumbnail image of the individual image whose representative image flag is set to "1" and generating an icon image. When the system software generates menu image data, the display processing section 44 outputs the menu image data to the display device 12, thus allowing the menu screen to be displayed on the display device 12.

When the user presses a given button of the input device 20 on the menu screen shown in FIG. 5, an instruction to play the image file is issued, activating the image viewer. This starts the playing of the image file identified by the icon image 202 arranged in the focus area. When the image viewer is activated, the output mode processing unit 110 determines the display output mode first. Here, the term "display output mode" refers to a mode adapted to identify whether the display device 12 displays a 2D or 3D image. When the output mode processing unit 110 determines the display output mode, the playing unit 130 generates a display image in accordance with the determined display output mode.

When the input acceptance unit 102 accepts the play instruction, the image viewer is activated, thus allowing the functions of the output mode processing unit 110 and playing unit 130 to be executed. In the output mode processing unit 110, the mode setting part 112 has a function to selectively set the 2D and 3D display output mode. When the image viewer is activated, the mode setting part 112 sets the 2D display output mode.

In the playing unit 130, the display target determination part 136 determines the image file to be displayed. When the image viewer is activated, the display target determination part 136 determines the image file identified by the icon image 202 as a file to be displayed, and the image data read part 138 reads the image file to be displayed and its attribute information from the image data storage section 152, supplying the file and attribute information to the display image generation part 134. The play control part 132 instructs the display image generation part 134 to generate a display image in the display output mode set by the mode setting part 112. As a result, the display image generation part 134 generates display image data by decoding the image data in accordance with the display output mode set by the mode setting part 112. When the image viewer is activated, the 2D display output mode is set by the mode setting part 112. Therefore, the display image generation part 134 generates 2D image data, and the display processing section 44 outputs the 2D image to the display device 12.

The notification image generation part 116 generates a notification image indicating that the display output mode can be changed. It is preferred that this notification image should not only indicate that the display output mode can be changed but also present, to the user, the operation adapted to change the display output mode. For example, if the operation adapted to change the display output mode is assigned to a specific button, it is preferred that a notification image should be formed including the button. For example, the notification image appears to read "□ 2D/3D" where "2D/3D" indicates that the display output mode can be changed, and "□" indicates that the operation button used to change the display output mode is the □ button 24.

The determination part 114 determines whether or not the conditions for generating a notification image are met. To begin with, if the display device 12 does not have a 3D-compatible display, it is not possible to change the display output mode from the 2D display output mode to the 3D display output mode. Therefore, the conditions for generating a notification image include at least the facts that the 2D display output mode has been set by the mode setting part 112 and that the display device 12 can display an image in 3D. When the determination part 114 determines that the conditions for generating a notification image are met, the notification image generation part 116 generates notification image data, and the display processing section 44 superimposes and displays the notification image on the 2D display screen.

FIG. 6 illustrates a notification image superimposed and displayed on the 2D display screen. The display processing section 44 arranges a notification image 210 generated by the notification image generation part 116 at a given position of the display screen. By viewing this notification, the user can recognize that the display image shown in 2D can be changed to a 3D display image by pressing the □ button 24. When wishing to switch to the 3D display output mode, the user presses the □ button 24. Then, the input acceptance unit 102 accepts the instruction to change the display output mode.

FIG. 7 illustrates a confirmation screen. When the input acceptance unit 102 accepts an instruction to change the display output mode, the confirmation image generation part 118 generates a confirmation image for changing the display output mode, and the display processing section 44 displays the confirmation screen on the display device 12. When a 3D display image is viewed, dedicated eyeglasses may be required depending on the type of the 3D display through which an image appears differently to the left and right eyes. Therefore, when the display output mode is changed to the 3D display output mode, a confirmation screen is presented to the user once to verify that the user has an intention to do so.

When the user selects "Yes" and presses the ○ button 22, the input acceptance unit 102 accepts the confirmation instruction, and the mode setting part 112 sets the display output mode to the 3D display output mode. As a result, the display output mode is changed. In response to the setting of the 3D display output mode, the play control part 132 instructs the display image generation part 134 and display processing section 44 to change the output format of the image file currently being displayed. As a result, the display image generation part 134 generates 3D image data made up of left and right eye image data, and the display processing section 44 outputs a 3D image from the display device 12.

It should be noted that the notification image 210 may be included as an option of a menu. If the user operates a given button, for example, while an image is displayed, a menu including a plurality of options is superimposed and displayed on the display screen. At this time, as the user selects the notification image 210 from the menu items, the input acceptance unit 102 accepts the instruction to change the display output mode. It should be noted that if a user interface is provided to select the notification image 210 from the menu items, the user can input an instruction to change the display output mode by selecting the notification image 210 and pressing the Decide button. Therefore, the display of "2D/3D" excluding "□" from the notification image 210 shown in FIG. 6 is included in the menu.

It should be noted that the user can also switch from the 3D display output mode over to the 2D display output mode. Because switching from the 3D display output mode over to the 2D display output mode is basically possible at any time, the notification image 210 may always appear on the display screen in the 3D display output mode. As a result, the user can return to the 2D display output mode at any time by pressing the □ button 24. It should be noted that the notification image 210 may be displayed in the 3D display output mode when given conditions are met as will be described later.

The confirmation screen shown in FIG. 7 is presented when the 2D display output mode is switched to the 3D display output mode. On the other hand, when the 3D display output mode is switched back to the 2D display output mode, the confirmation image generation part 118 does not generate any confirmation image. The reason for this is that viewing a 2D display image does not require any dedicated eyeglasses and therefore reconfirmation lacks necessity when the display output mode is switched back to the 2D display output mode. By not showing a confirmation screen, it is possible to make a smooth transition from the 3D display output mode to the 2D display output mode.

It should be noted that the display image generation part 134 may determine image data of 3D content as data to be displayed in the 2D display output mode. For example, an image file in MP format added with a stereoscopic type code is content that is designed to be displayed in 3D. In such a case, therefore, it is preferred that the user should be notified that the file can be displayed in 3D.

For this reason, in addition to the fact that the 2D display output mode has been set by the mode setting part 112 and that the display device 12 is capable of 3D display, the conditions for generating a notification image may include the generation of a display image from 3D image data by the display image generation part 134. For example, if the display target determination part 136 identifies an image file to be displayed, the determination part 114 reads the display format (type code) associated with the image file from the attribute information storage section 154, determining whether or not the image file is a stereoscopic image. When the image file to be displayed is switched from 2D content over to 3D content, the determination part 114 determines that the conditions for generating a notification image are met. The notification image generation part 116 generates the notification image 210 shown in FIG. 6, and the display processing section 44 superimposes the notification image 210 on the 2D display image to display the notification image 210. This allows the output mode processing unit 110 to effectively present, to the user, an occasion to display 3D content in 3D. It should be noted that when the display output mode is changed, the display processing section 44 may display the notification image 210 to ensure that the user can switch the display output mode back to the original mode.

It should be noted that there are times when, during display of 3D content, the display image generation part 134 determines image data of 2D content as data to be displayed after the display processing section 44 has displayed the notification image 210 and the user has switched from the 2D display output mode over to the 3D display output mode in accordance with the displayed notification image 210. An image file of 2D content is designed to be displayed in 2D. Therefore, it is preferred that the user should be notified that the file can be displayed in 2D.

For this reason, the facts that the user has selected, at the time of 3D content display, the 3D display output mode in accordance with the notification image 210 and that the display image generation part 134 generates a display image from 2D image data are defined as conditions of notification, and if the determination part 114 determines that the conditions for generating a notification image are met, the notification image generation part 116 generates notification image data, and the display processing section 44 superimposes and displays the notification image 210 on the 3D display screen. Alternatively, the end of playing of a photographic image may be defined as a condition of notification so that the display processing section 44 superimposes and displays the notification image 210 on the 3D display screen.

As described above, if the display device 12 has a 3D-output capable display, the user can choose whether to display an image in the 2D or 3D display output mode. It should be noted that the mode setting part 112 sets the 2D display output mode as a default setting when the image viewer is activated in consideration of the fact that viewing of a 3D display image requires dedicated eyeglasses. However, if the display device 12 supports 3D rather than 2D, the mode setting part 112 sets the 3D display output mode as a default setting.

As described above, the display output mode is determined by the output mode processing unit 110. A description will be given below of the playing of an image by the playing unit 130.

In the present embodiment, the sequence in which a plurality of image files, stored in the image data storage section 152, are displayed is set in advance by the image viewer. This sequence of display may be that in which the image files were stored in the image data storage section 152 or that which reflects the dates and times when the respective image files were created (capture dates and times). When an image is displayed on the display device 12 after the activation of the image viewer, the user can switch between the image files to be displayed by pressing the L1 button 29a or R1 button 29b provided on the rear face of the enclosure of the input device 20. When a given image file is decoded and displayed on the display device 12, pressing of the L1 button 29a by the user decodes and displays the previous image file on the display device 12. On the other hand, pressing of the R1 button 29b decodes and displays the next image file on the display device 12. As described above, in the image processor 10, the operation of the L1 button 29a by the user issues an instruction to display a series of image files, arranged in a set sequence, in reverse direction. On the other hand, the operation of the R1 button 29b by the user issues an instruction to display the series of image files in normal direction. An instruction adapted to switch between display images will be hereinafter referred to as a "display switching instruction."

The image viewer provides effect options for switching between images to the user. At least the following two options are available:

(1) Cross-Fade Effect

Cross-fade effect refers to an effect of switching between display images by fading in one of two display images while the other display image is fading out. Assuming that the opacity of a display image generated by decoding image data is 100% and that the opacity of a display image that has completely faded out on the screen is 0%, a cross-fade effect is achieved by starting to fade out a first display image from a 100% opacity and fading in a second display image from a 0% opacity before the opacity of the first display image reaches 0%.

(2) Normal Effect

Normal effect refers to an effect of switching between two display images instantaneously. Instantaneous switching can be explained as follows in terms of opacity described above. That is, a normal effect is achieved by reducing the opacity of a first display image from 100% to 0% without fading it and then increasing the opacity of a second display image from 0% to 100%. In a normal effect, the opacity of either of the display images does not take on any intermediate value between 0% and 100%.

(3) Fade-Out Fade-in Effect

Fade-out fade-in effect refers to an effect of switching between display images by fading out one display image first and then fading in another display image. Unlike a cross-fade effect, a first display image is faded out from a 100% opacity, and after the opacity thereof reaches 0%, a second display image is faded in from a 0% opacity.

When the image viewer is activated, the user selects an effect for switching between images. For example, a user interface may be provided so that the user can select normal effect from the menu items if cross-fade effect is set as a default setting as an effect for switching between images, and the user desires the normal effect. A description will be given below of cross-fade effect and normal effect.

The play control part 132 controls switching between display images in accordance with the display output mode set by the mode setting part 112. More specifically, the play control part 132 changes the manner in which to control switching between display images between the 2D and 3D display output modes.

Figure 8A:
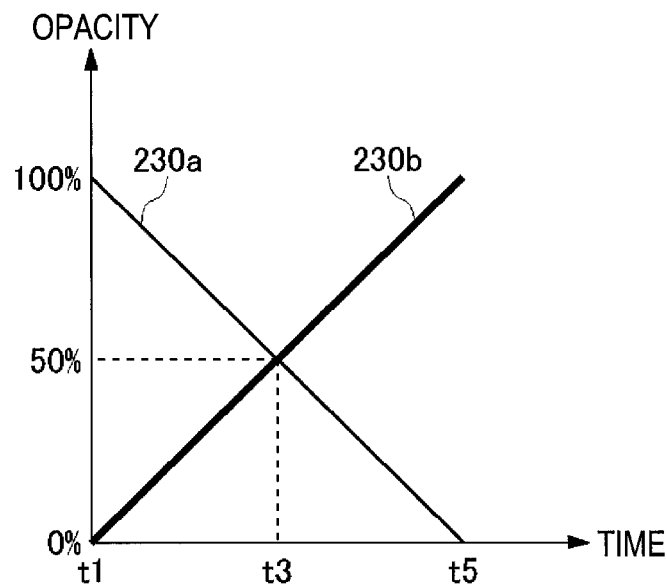
FIGS. 8(a) and 8(b) are explanatory diagrams of crossfade effect.
Figure 8B:
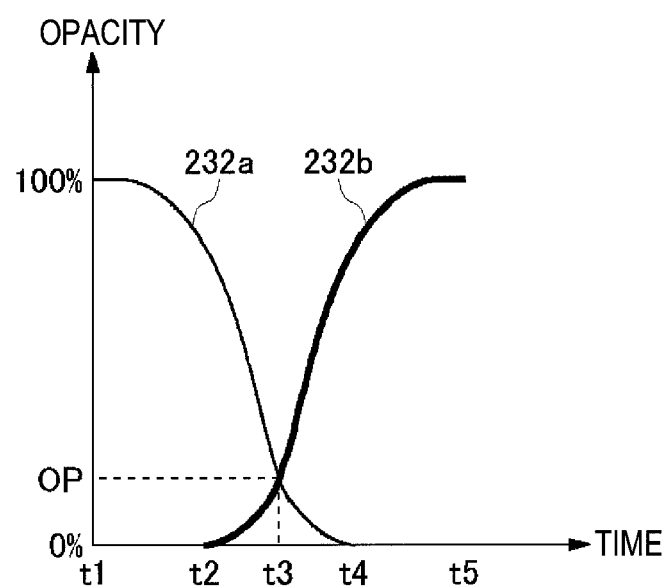

FIGS. 8(*a*) and 8(*b*) are explanatory diagrams of cross-fade effect. FIG. 8(*a*) illustrates cross-fade effect in the 2D display output mode, and FIG. 8(*b*) illustrates cross-fade effect in the 3D display output mode. In cross-fade effect, the opacity of an image displayed first (hereinafter referred to as a "first display image") is gradually reduced from 100% to 0% with time, and the opacity of an image displayed next (hereinafter referred to as a "second display image") is gradually increased from 0% to 100% with time. At this time, a cross-fade effect is achieved by fading in the second display image while the first display image is fading out rather than fading in the second display image after the first display image has faded out.

Assuming that the pixel value of a display image generated by decoding image data is P0, the opacity of the pixel value P0 is 100%. When the pixel value is reduced to P1, the opacity of the pixel value P1 is equal to (P1/P0)×100%. Therefore, the opacity is 0% when the pixel value is 0 as a result of complete fading-out of the display image. The play control part 132 controls the display image generation part

134 to change the opacities of the first and second display images with time, thus cross-fading the two display images.

In FIGS. 8(*a*) and 8(*b*), the vertical axis represents the opacity, and the horizontal axis the time. Fine lines in these figures represent the change in opacity of the first display image, and bold lines the change in opacity of the second display image. Further, the start time of a cross-fade effect is shown as time t1, and the end time thereof as time t5. It should be noted that a cross-fade effect starts when the opacity of the first display image begins to decrease from 100% and ends when the opacity of the second display image reaches 100%. In the description given below, the period of time from the start time to the end time of a cross-fade effect (from t1 to t5) will be referred to as a "cross-fading period." When the input acceptance unit 102 accepts an instruction to change the display at time t1, the play control part 132 begins to control the cross-fade effect.

In FIG. 8(*a*), a first change line 230*a* represents the change in opacity of the first display image, and a second change line 230*b* the change in opacity of the second display image. The first and second change lines 230*a* and 230*b* intersect each other at the center (t3) of the cross-fading period, with the opacities of the two images at this moment both being 50%. In the 2D display output mode, letting the opacity of the first display image during the cross-fading period be denoted by α%, the opacity of the second display image is expressed as (100−α)%. Therefore, the sum of the opacities of the first and second display images is α%+(100−α)%=100%.

In FIG. 8(*b*), a first change line 232*a* represents the change in opacity of the first display image, and a second change line 232*b* the change in opacity of the second display image. The first and second change lines 232*a* and 232*b* intersect each other at the center (t3) of the cross-fading period, with the opacities of the two images at this moment both being OP % (<50%). In the 3D display output mode, letting the opacity of the first display image during the cross-fading period be denoted by β% and the opacity of the second display image by γ%, the first and second change lines 232*a* and 232*b* are set so that (β+γ)% is 100% or less.

It should be noted that (β+γ) is 100% when cross-fading begins (t1) and ends (t5). At any other time of the cross-fading period, (β+γ)<100. That is, during the cross-fading period, (β+γ)%, the sum of the opacities of the first and second display images in the 3D display output mode, is set equal to or smaller than the sum of the opacities of the first and second display images in the 2D display output mode, 100%. This means that the extent of overlap between the two display images (sum of the opacities of the two display images) in a cross-fade effect is smaller in the 3D display output mode than in the 2D display output mode.

If the first and second display images are cross-faded in the 3D display output mode, there are times when these image differ in parallax. In such a case, α-blending the first and second display images as shown in FIG. 8(*a*) makes it more likely, due to the difference in parallax between the two display images, that the user will feel a sense of discomfort. Further, even if the two display images do not differ in parallax, superimposing and displaying the two 3D images on the screen makes it more likely, after all, that the user will feel a sense of discomfort. For this reason, the extent of overlap between the two display images in a cross-fade effect is smaller in the 3D display output mode than in the 2D display output mode, thus providing an effect that is easy on the user's eyes.

During the cross-fading period, on the other hand, the opacity (OP %) of each of the first and second display images when the two images are equal in opacity in the 3D display output mode is set smaller than the opacity (50%) of each of the first and second display images when the two images are equal in opacity in the 2D display output mode. If the two display images differ in parallax when they are equal in opacity (t3), the user will feel the greatest sense of discomfort. Therefore, the sense of discomfort felt by the user can be reduced by reducing the opacity OP % in the 3D display output mode at time t3. It is preferred that OP should be set to 30 or less.

Further, in FIG. 8(*a*), the second display image begins to fade in at time t1, and the first display image finishes fading out at time t5. During the cross-fading period, therefore, the period of time (overlap period) in which both the first and second display images appear is from time t1 to time t5. In FIG. 8(*b*), on the other hand, the second display image begins to fade in at time t2, and the first display image finishes fading out at time t4. Therefore, the overlap period is from time t2 to time t4. As described above, it is possible to reduce the sense of discomfort felt by the user while at the same time implementing a cross-fade effect by reducing the overlap period in the 3D display output mode more than in the 2D display output mode.

As described above, the play control part 132 controls the image generation process performed by the display image generation part 134 in accordance with the display output mode. As a result, the display image generation part 134 adjusts the pixel value of image data generated by itself in accordance with the change lines shown in FIGS. 8(*a*) and 8(*b*). This makes it possible to implement a cross-fade effect that is easy on the user's eyes in the 3D display output mode.

It should be noted that the play control part 132 may control the display process performed by the display processing section 44 in accordance with the display output mode. The display processing section 44 adjusts the pixel value of image data with 100% opacity generated by the display image generation part 134 in accordance with the change lines shown in FIG. 8(*a*) or 8(*b*). Leaving the task of adjusting the pixel value to the display processing section 44 eliminates the need for the display image generation part 134 to generate image data for each frame, making it possible to significantly reduce the processing burden of the system as a whole.

Figure 9A:
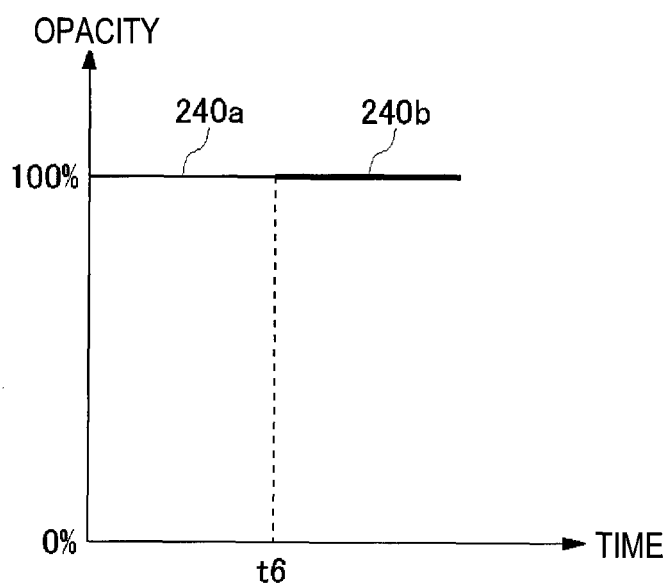
FIGS. 9(a) and 9(b) are explanatory diagrams of normal effect.
Figure 9B:
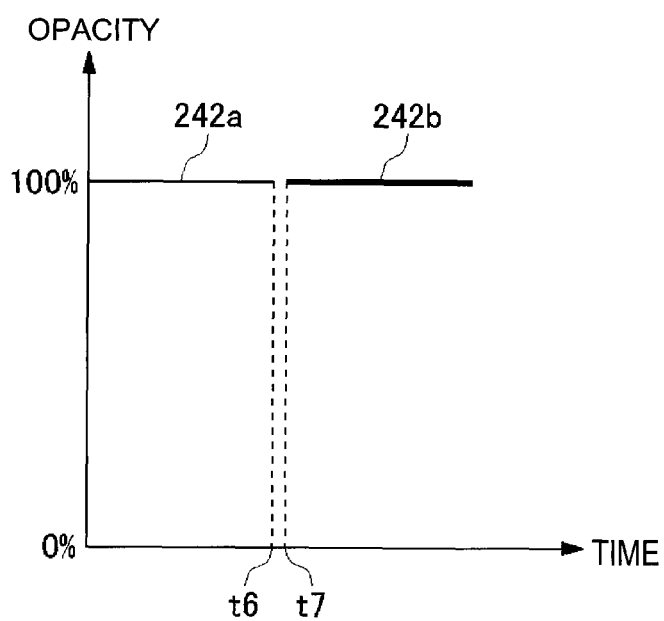

FIGS. 9(*a*) and 9(*b*) are explanatory diagrams of normal effect. FIG. 9(*a*) illustrates normal effect in the 2D display output mode, and FIG. 9(*b*) illustrates normal effect in the 3D display output mode. In normal effect, the opacity of an image displayed first (hereinafter referred to as a "first display image") is reduced from 100% to 0%, and the opacity of an image displayed next (hereinafter referred to as a "second display image") is instantaneously increased from 0% to 100%. That is, in normal effect, no opacity between 0% and 100% is used, and the second display image begins to appear after the display of the first display image ends. The play control part 132 implements a normal effect by controlling the display processing section 44 or display image generation part 134 to instantaneously switch from the first display image over to the second display image. It should be noted that the term "switching between the display images instantaneously" includes not only a case in which the display of the first display image ends and the display of the second display image begins at the same time but also a case in which the display of the second display image begins shortly after the end of the display of the first display image.

In FIGS. 9(*a*) and 9(*b*), the vertical axis represents the opacity, and the horizontal axis the time. Fine lines in these figures represent the display state of the first display image, and bold lines the display state of the second display image.

Further, the end time of the display of the first display image is shown as time t6. When the input acceptance unit 102 accepts an instruction to change the display at time t6, the play control part 132 begins to control the normal effect.

In FIG. 9(*a*), a first line 240*a* represents the display state of the first display image, and a second line 240*b* the display state of the second display image. The second display image is displayed from the frame following the end of the display of the first display image. That is, in the 2D display output mode, the last frame of the first display image is continuous with the first frame of the second display image.

In FIG. 9(*b*), a first line 242*a* represents the display state of the first display image, and a second line 242*b* the display state of the second display image. The second display image is displayed several frames after the end of the display of the first display image. In this example, the display of the first display image ends at time t6, and the second display image begins to appear several frames later such as at time t7 which is three frames later. That is, in the 3D display output mode, the last frame of the first display image is not continuous with the first frame of the second display image.

As described above, the switching period from the end of the display of the first display image to the beginning of the display of the second display image is set longer in the 3D display output mode than in the 2D display output mode. If the first and second display images are switched instantaneously in the 3D display output mode, there are times when these images differ in parallax. In such a case, switching the first and second display images continuously as shown in FIG. 9(*a*) makes it more likely, due to the difference in parallax between the two display images, that the user will feel a sense of discomfort. For this reason, the image switching period is longer in the 3D display output mode than in the 2D display output mode, thus providing a switching effect that is easy on the user's eyes.

It should be noted that the present inventor has gained knowledge that displaying an image of a given color during a switching period can reduce the sense of discomfort in the 3D display output mode. This given color is, for example, black. When 3D images are switched in the 3D display output mode, the difference in amount of parallax between two display images can be reset by inserting a black image during a switching period, thus making it possible to further reduce the sense of discomfort felt by the user. It should be noted that a black image may also be inserted during a switching period when 2D images are switched. As described earlier, however, it is preferred that the switching period should be set longer in the 3D display output mode than in the 2D display output mode, and therefore, that the display time of the black image should be longer in the 3D display output mode.

As described above, the play control part 132 controls the display process performed by the display processing section 44 in accordance with the display output mode, and the display processing section 44 switches between display images in accordance with the switching process shown in FIG. 9(*a*) or 9(*b*). This makes it possible to provide a normal effect that is easy on the user's eyes in the 3D display output mode.

It should be noted that, in fade-out fade-in effect, the switching period from the end of the display of the first display image to the beginning of the display of the second display image is also set longer in the 3D display output mode than in the 2D display output mode. An image of a given color may be displayed during a switching period as in normal effect, and the display time of the black image is set longer in the 3D display output mode. This makes it possible to provide a fade-out fade-in effect that is easy on the user's eyes in the 3D display output mode.

A description has been given above of the effects available for switching between display images in each display output mode. A description will be given below of an example in which 3D display is stopped and then switched to 2D display when the display condition of the screen is no longer appropriate for 3D display.

Figure 10:
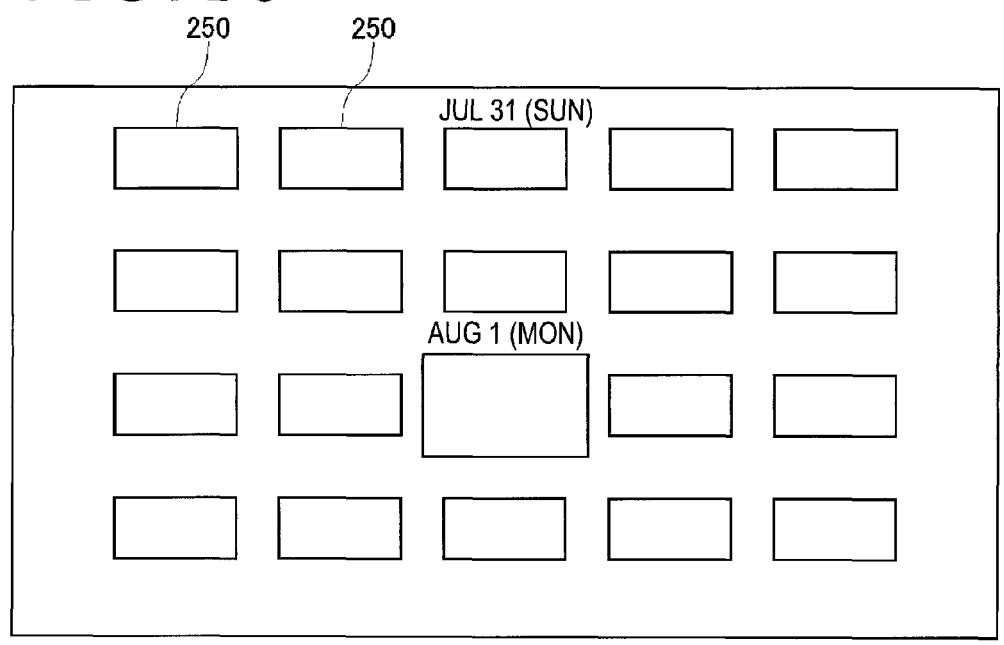
FIG. 10 is a diagram illustrating an example of displaying a plurality of photographic images in a grid form.

FIG. 10 is a diagram illustrating an example of displaying a plurality of 3D photographic images in a grid form. The display image generation part 134 generates 3D image data having a plurality of photographs arranged therein, and the display processing section 44 displays, on the display device 12, a display image having a plurality of 3D photographic images 250 arranged therein.

The display image generation part 134 generates left and right eye image data from an image file captured in Multi-Picture Format as a stereoscopic image, and the display processing section 44 displays left and right eye images on the screen, thus allowing a 3D image to appear. It should be noted that the display image generation part 134 can also generate left and right eye image data from not only the image file for stereoscopic image but also from a single piece of image data created in JPEG, GIF or other format. The display processing section 44 outputs, to the display device 12, left eye image data having a plurality of pieces of photographic image data for left eye arranged on the background image and right eye image data having a plurality of pieces of photographic image data for right eye arranged on the background image, thus allowing the grid display screen shown in FIG. 10 to appear.

As another example, the display image generation part 134 may have a geometry engine and rendering engine, generating left and right eye image data. In this case, the geometry engine arranges a plurality of photographic objects in a virtual space and sets up two virtual cameras in such a manner that the directions of the lines of sight of the cameras intersect each other, and the rendering engine renders data from each of the virtual cameras, thus generating left and right eye image data. The display processing section 44 outputs the generated left and right image data to the display device 12, thus generating the grid display screen shown in FIG. 10.

As described above, the display processing section 44 displays a 3D image generated by the display image generation part 134. During display of the 3D image, the play control part 132 controls the display of the display processing section 44 based on the display condition of the screen. More specifically, if the display condition of the screen goes into a given display condition during the display processing section 44 displays the 3D image, the play control part 132 controls and causes the display processing section 44 to stop the display of a 3D image and start the display of a 2D image.

The grid display screen shown in FIG. 10 is used, for example, to display photographic images all together for each capture date. Therefore, scrolling the display screen moves the entire display screen upward or downward, displaying the photographic images captured on dates other than the displayed date. The user can scroll the display screen by operating the analog stick 27*b* of the input device 20. For example, tilting the analog stick 27*b* upward (backward) scrolls the grid display screen upward, and tilting it downward (forward) scrolls the grid display screen downward.

When the grid display screen moves as-is in 3D, the user must follow each photographic image with eyes. As a result, the user is more likely to feel a sense of discomfort as a result of adjusting the parallax. For this reason, if the display image moves, the play control part 132 causes the display processing section 44 to stop the display of a 3D image and start the display of a 2D image.

For example, if the display image generation part 134 generates image data for both eyes from an image file, the display processing section 44 may display a 2D grid display screen using only one of two pieces of image data. Alternatively, the play control part 132 may instruct the display image generation part 134 to generate a 2D image so that the display processing section 44 displays a 2D grid display screen on the display device 12 using the 2D image data generated by the display image generation part 134.

Further, if generating image data for both eyes by rendering, the display image generation part 134 renders data from each of the virtual cameras in such a manner that the positions of the cameras and the directions of the lines of sight thereof agree with each other, thus allowing the display processing section 44 to display a 2D grid display screen on the display device 12.

It should be noted that while the display screen is scrolled slowly, the user does not feel a significant sense of discomfort. Therefore, the play control part 132 may monitor the speed of motion of the display image and cause the display processing section 44 to stop the display of a 3D image and start the display of a 2D image if the speed of motion of the display image exceeds a given level. For example, if the speed of motion exceeds a given level, a 2D image may be displayed by generating left and right eye image data in such a manner that the amount of parallax smoothly reaches 0. Alternatively, if the speed of motion exceeds a given level, a 2D image may be displayed by reducing the amount of parallax in accordance with the speed of motion. This reduces the sense of discomfort felt by the user during quick scrolling, and, at the same time, makes it possible to continue with a 3D display during slow scrolling.

Figure 11:
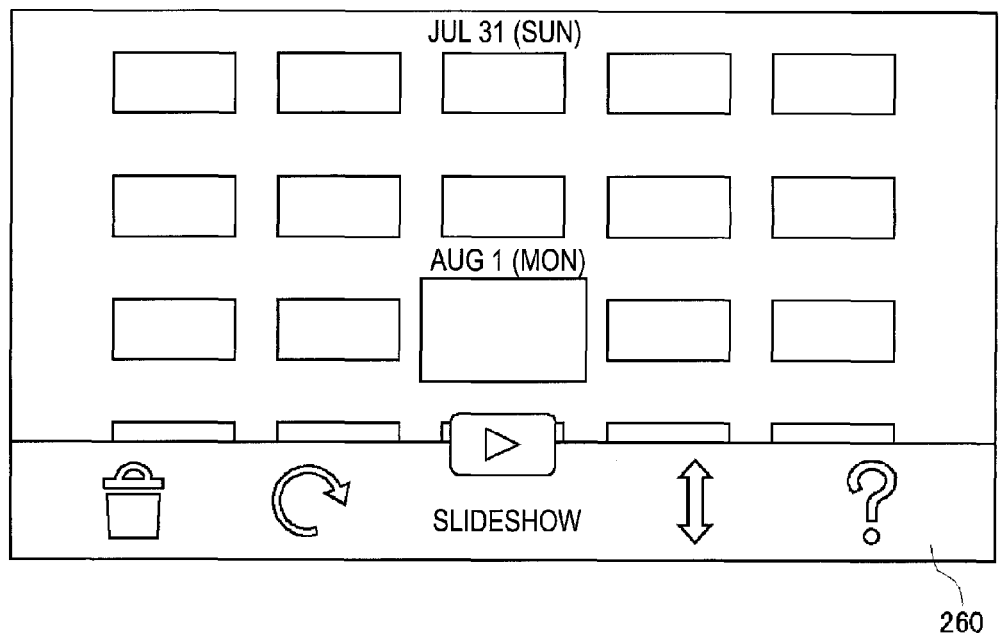
FIG. 11 is a diagram illustrating an example of displaying a menu display area on an image.

FIG. 11 illustrates an example of displaying a menu display area on a 3D image. Here, a menu display area 260 showing a plurality of menu items is superimposed on a 3D grid display screen. It should be noted that the plurality of menu items are displayed in 2D. In the menu display area 260, the user places a desired menu item in a focus area at the center and presses the Decide button, thus activating the process associated with the selected item. The menu item placed in the focus area may be displayed in 3D.

The menu items in the menu display area 260 are displayed in 2D in areas other than the focus area. Therefore, if the grid display screen, the background, is displayed in 3D, there is a likelihood that parallax inconsistency may arise which causes the grid display screen in the background to appear to pop out at the user more than the menu items. For this reason, if another image is superimposed and displayed on the display image, the play control part 132 causes the display processing section 44 to display the background image in 2D. As described above, it is possible to provide a user a display screen that is easy on the user's eyes by avoiding the superimposition of a 2D image on a 3D image.

Although an example has been described above in which the play control part 132 controls the display performed by the display processing section 44, the play control part 132 may cause the display image generation part 134 to stop the generation of 3D image data and generate 2D image data so that the display processing section 44 displays a 2D image on the display device 12 using the 2D image data generated by the display image generation part 134.

The present invention has been described above based on the embodiment. This embodiment is illustrative, and it is understood by those skilled in the art that the combinations of components and processes can be modified in various ways, and that these modification examples also fall within the scope of the present invention.

REFERENCE SIGNS LIST

1 . . . Image processing system, 10 . . . Image processor, 12 . . . Display device, 20 . . . Input device, 44 . . . Display processing section, 100 . . . Control section, 102 . . . Input acceptance unit, 110 . . . Output mode processing unit, 112 . . . Mode setting part, 114 . . . Determination part, 116 . . . Notification image generation part, 118 . . . Confirmation image generation part, 130 . . . Playing unit, 132 . . . Play control part, 134 . . . Display image generation part, 136 . . . Display target determination part, 138 . . . Image data read part, 150 . . . Display information storage section, 152 . . . Image data storage section, 154 . . . Attribute information storage section.

INDUSTRIAL APPLICABILITY

The present invention is applicable to the field of image processing technology.

The invention claimed is:

1. An image processor comprising:
a mode setting part adapted to selectively set a display output mode selected from a 2D display output mode and a 3D display output mode on a display; and
a play control part adapted to control a switching technique used to switch from a first display image to a second display image,
wherein a display area of the first display image and a display area of the second display image overlap on the display;
wherein the switching technique used in the 2D display output mode is different than the switching technique used in the 3D display output mode,
the switching technique used in the 2D display output mode and the switching technique used in the 3D display output mode is a crossfading technique, and
the play control part changes the opacities of the first display image and the second display image with time so that while the first display image and the second display image both have opacities greater than zero, a sum of the opacities of the first display image and the second display image in the 3D display output mode is smaller than a sum of the opacities of the first display image and the second display image in the 2D display output mode;
wherein at a time point when the first display image and the second display image have equal opacities during crossfading, a sum of the opacities of the first display image and the second display image in the 2D output mode is greater than a sum of the opacities of the first display image and the second display image in the 3D output mode.

2. A method for displaying images on a display, comprising:
selectively setting a display output mode selected from a 2D display output mode and a 3D display output mode on the display; and controlling a switching technique used for switching from a first display image to a second display image, wherein a display area of the first display image and a display area of the second display image overlap on the display;

wherein at a time point when the first display image and the second display image have equal opacities during crossfading, a sum of the opacities of the first display image and the second display image in the 2D output mode is greater than a sum of the opacities of the first display image and the second display image in the 3D output mode.

3. A non-transitory computer-readable recording medium storing a program thereon, the program comprising:

a mode setting part adapted to selectively set a display output mode selected from a 2D display output mode and a 3D display output mode on a display; and a play control part adapted to control a switching technique used to switch from a first display image to a second display image, wherein a display area of the first display image and a display area of the second display image overlap on the display;

the play control part changing the manner in which to control switching between display images in accordance with the display output mode set by the mode setting part, wherein the switching technique used in the 2D display output mode is different than the switching technique used in the 3D display output mode, wherein if the play control part switches between the first display image and the second display image instantaneously, a switching period greater than zero from ending display of the first display image to beginning display of the second display image is longer in the 3D display output mode than in the 2D display output mode, and wherein the play control part displays an image of a given color during the switching period in the 3D display output mode and the 2D display output mode;

wherein at a time point when the first display image and the second display image have equal opacities during crossfading, a sum of the opacities of the first display image and the second display image in the 2D output mode is greater than a sum of the opacities of the first display image and the second display image in the 3D output mode.

\* \* \* \* \*